(12) United States Patent
Welch

(10) Patent No.: US 8,721,403 B2
(45) Date of Patent: May 13, 2014

(54) KNIFE STORAGE AND SHARPENING APPARATUS

(75) Inventor: Alan Rupert Welch, Warwickshire (GB)

(73) Assignee: Robert Welch Designs Limited, Chipping Campden, Gloucestershire (GB)

( * ) Notice: Subject to any disclaimer, the term of this patent is extended or adjusted under 35 U.S.C. 154(b) by 1213 days.

(21) Appl. No.: 12/016,562

(22) Filed: Jan. 18, 2008

(65) Prior Publication Data
US 2008/0173772 A1   Jul. 24, 2008

(30) Foreign Application Priority Data
Jan. 20, 2007   (GB) .................................. 0701106.7

(51) Int. Cl.
*B23F 21/03*   (2006.01)

(52) U.S. Cl.
USPC ............ 451/552; 451/555; 30/138; 211/70.7; 206/553

(58) Field of Classification Search
USPC ............ 451/45, 451, 552, 555, 556; 206/553; 211/70.7; 30/138, 139, 298.4
See application file for complete search history.

(56) References Cited

U.S. PATENT DOCUMENTS

| | | | |
|---|---|---|---|
| 3,135,383 A * | 6/1964 | Bloch | 206/553 |
| 3,583,104 A * | 6/1971 | Petroske et al. | 451/241 |
| 4,502,218 A * | 3/1985 | Carter et al. | 30/138 |
| 4,866,845 A * | 9/1989 | McEvily | 30/138 |
| 4,869,027 A * | 9/1989 | McEvily | 451/555 |
| 5,233,793 A * | 8/1993 | Dandurand | 451/461 |
| 5,458,534 A * | 10/1995 | Campione et al. | 451/555 |
| 5,494,176 A * | 2/1996 | Zallo | 211/70.7 |
| 6,224,475 B1 * | 5/2001 | May et al. | 451/555 |
| 6,581,774 B1 * | 6/2003 | Galafassi et al. | 206/553 |
| D483,624 S * | 12/2003 | Bradshaw | D7/638 |
| 6,676,490 B1 * | 1/2004 | Kendhammer | 451/45 |
| 2003/0038098 A1 * | 2/2003 | Stuchlik, III | 211/70.7 |
| 2005/0205506 A1 * | 9/2005 | Siegel | 211/70.7 |
| 2007/0167122 A1 * | 7/2007 | Henry | 451/523 |

FOREIGN PATENT DOCUMENTS

DE   202004004063 U1   7/2004

* cited by examiner

*Primary Examiner* — Eileen P. Morgan
(74) *Attorney, Agent, or Firm* — MacMillan, Sobanski & Todd, LLC

(57) ABSTRACT

A knife storage and sharpening apparatus including a knife block having a plurality of elongate recesses each for receipt of a different knife and having a recess for receipt of a knife sharpening steel. The apparatus further includes another form of knife sharpening means specifically adapted for receipt in the recess for receipt of the steel. The knife sharpening means can be used to sharpen a knife while it is mounted in the sharpening steel recess. If the knife user prefers to use a sharpening steel, the knife sharpening means may be removed from the knife block to provide storage for the sharpening steel.

6 Claims, 4 Drawing Sheets

US 8,721,403 B2

KNIFE STORAGE AND SHARPENING APPARATUS

CROSS-REFERENCE TO RELATED APPLICATIONS

Priority is claimed to United Kingdom patent application Serial No. 0701106.7 filed Jan. 20, 2007.

STATEMENT REGARDING FEDERALLY SPONSORED RESEARCH OR DEVELOPMENT

Not Applicable.

TECHNICAL FIELD

The invention relates to knife blocks of the type which hold a plurality of knives, and particularly to a knife block having a sharpening steel recess and which includes a knife sharpener which can be used in situ and which is removably mounted in the sharpening steel recess.

BACKGROUND OF THE INVENTION

Knife blocks of many sorts are well known, and comprise a block of material, such as wood, with a plurality of elongate recesses each intended for receipt of a knife. Usually the elongate recesses are of different generally rectangular cross sectional shapes such that they are suitable for receipt of different sizes of knives as would typically be included in a collection of kitchen knives.

One problem which many users of such knives often experience is that the knives become less sharp over time, such that they no longer perform adequately in the kitchen. Clearly the solution to this problem is to sharpen the knives. However, the necessary equipment to sharpen the knives may not be readily to hand or may require skills that the knife user does not have. This can mean that the knives are not sharpened when they should be.

It is also known to provide a knife block with an elongate recess specifically for receipt of a knife sharpening means in the form of a traditional "steel" (a hand held knife sharpening means being an elongate piece of steel, and sometimes these days of other materials such as ceramics, which is generally round or oval in cross section, and may be textured, with a handle to hold it by when using it to sharpen a knife). However, using a steel to sharpen a knife is a skilled process, and that skill is often not taught to the users of knives, thus this solution does not solve the problem for all users.

BRIEF SUMMARY OF THE INVENTION

According to the present invention there is provided a knife storage and sharpening apparatus including a block having a plurality of elongate recesses each for receipt of a different knife and having a recess for receipt of a knife sharpening means in the form of a steel. The apparatus further includes another form of knife sharpening means specifically adapted for receipt in the sharpening steel recess such that it can be used to sharpen a knife when in situ in that recess. The invention provides the advantage that a knife sharpening means of a simple form to use is readily available at all times. If the user is skilled in using a sharpening steel, the knife sharpening means may be removed from the knife block and replaced with a conventional sharpening steel.

Various objects and advantages of the invention will become apparent from the following detailed description of the invention and the accompanying drawings.

DETAILED DESCRIPTION OF THE INVENTION

Figure 1:
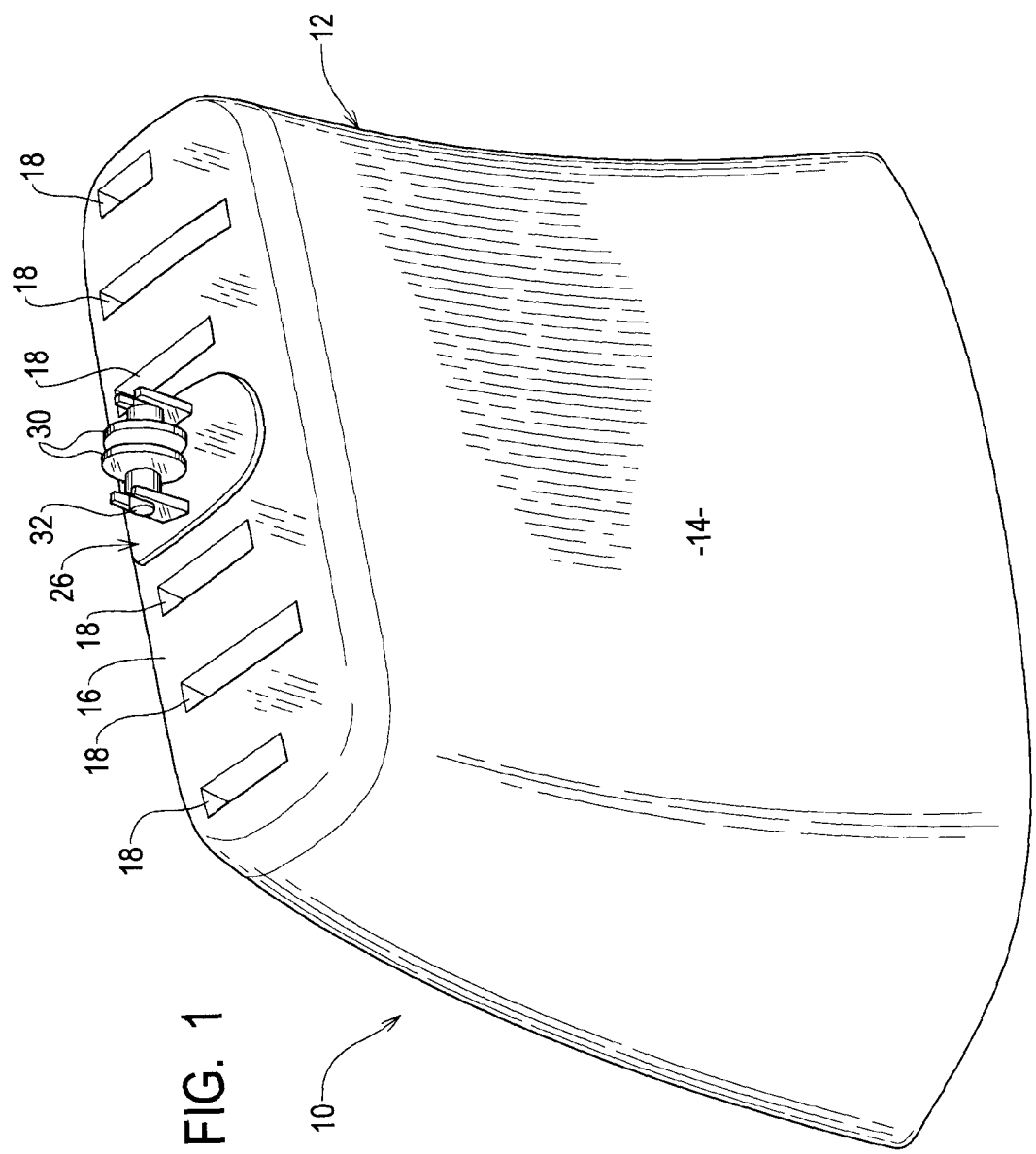
FIG. 1 is a perspective view of a knife storage and sharpening apparatus according to the invention, with a knife sharpening means in situ in the recess for receipt of a knife sharpening means.
Figure 2:
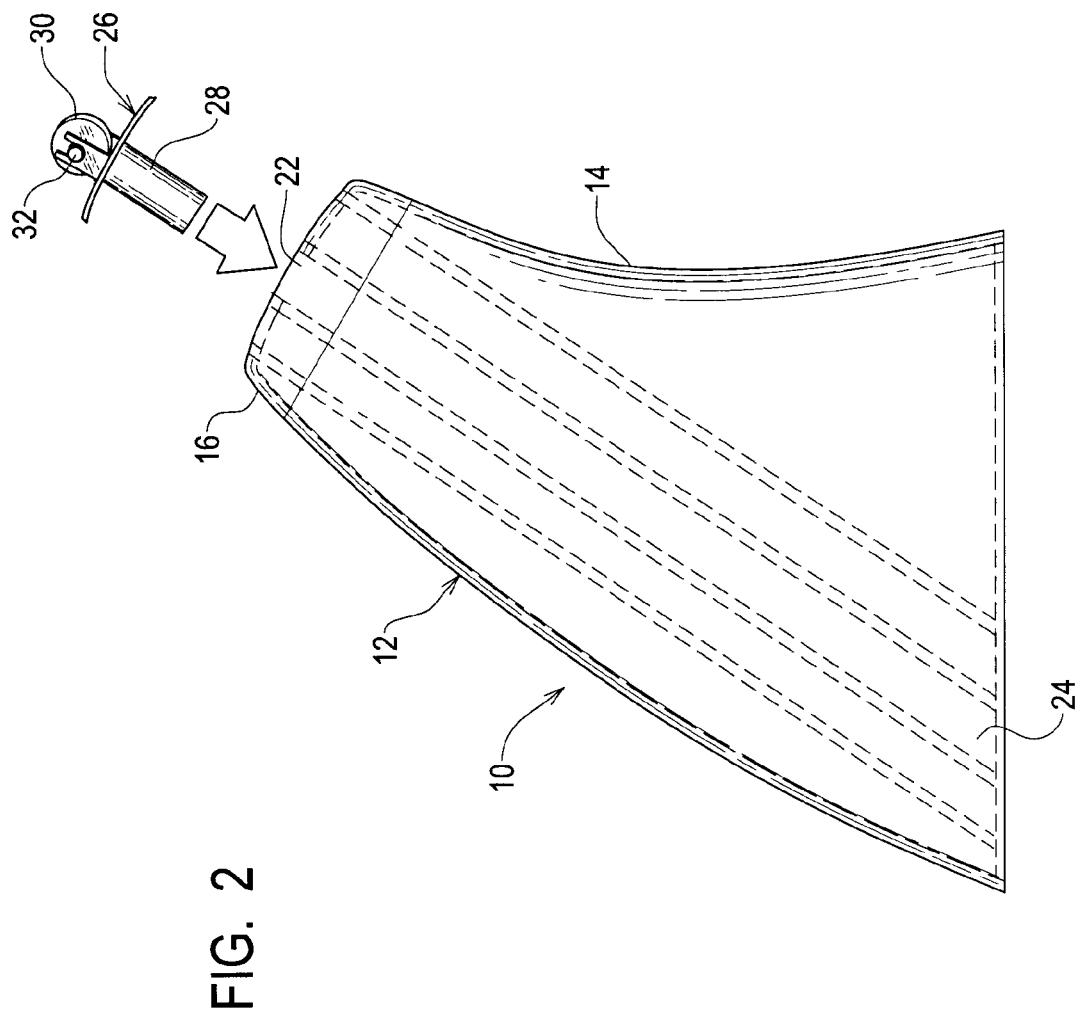
FIG. 2 is a side view of the knife storage and sharpening apparatus of FIG. 1, with the knife sharpening means located in alignment with the recess for receipt of a knife sharpening means but not in situ.
Figure 3:
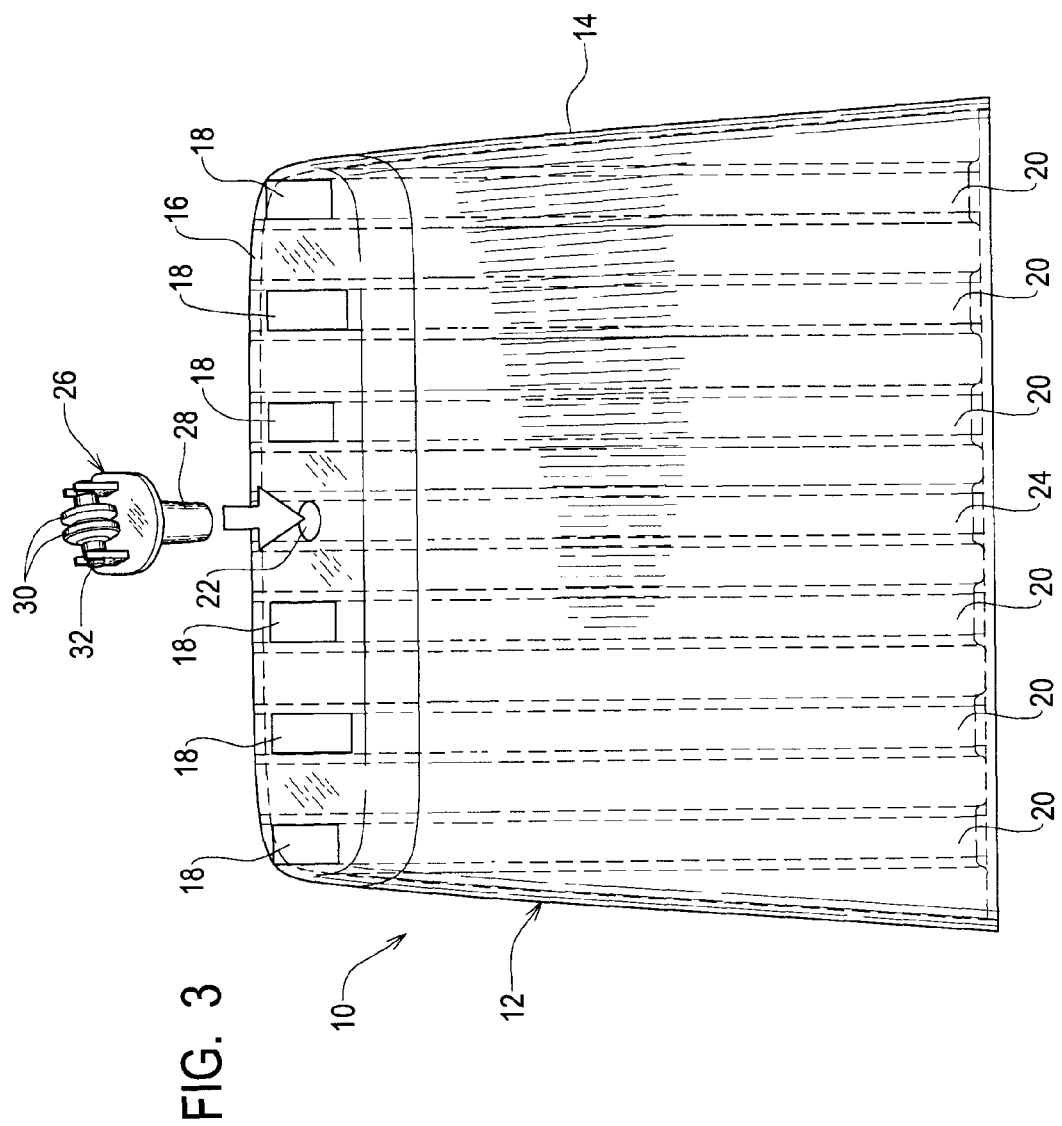
FIG. 3 is an exploded front view of the knife storage and sharpening apparatus of FIG. 1, with the knife sharpening means located in alignment with the recess for receipt of a knife sharpening means but not in situ.
Figure 4:
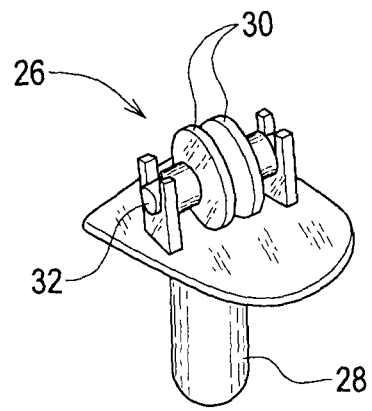
FIG. 4 is a perspective view of a first embodiment of knife sharpening means, as also shown in FIGS. 1 to 3.

Referring to FIGS. 1 to 4, a knife storage and sharpening apparatus 10 which includes a knife block 12 having a body 14, with a top 16 which in the illustrated embodiment is angled forwardly towards the user. Alternately, the top 16 may be generally horizontal. The top 16 includes a plurality of openings 18 which each lead to an elongate recess 20 within the body 14. Each opening 18 and recess 20 is generally rectangular in cross-section and is intended for receipt of a knife (not shown) for the purposes of storing the knife without damage to the blade thereof. The openings 18 and associated recesses 20 may be of a range of different cross-sectional dimensions so as readily to accommodate a typical selection of kitchen knives. Preferably each recess includes one or more guide members (not shown) which act to ensure that the blade of the knife is supported optimally within the recess in order to minimize the chances of damage to the blade, as damage can occur if the blade runs along a wall of the recess.

The knife block 12 also includes an opening 22 which leads to a recess 24, the opening 22 and recess 24 may be approximately round in cross-section or it may be square in cross section, and is sized for receipt of a conventional sharpening steel or similar knife sharpening means. The term "sharpening steel" is intended to include knife sharpeners of the type having an elongated rod of steel or of an abrasive material which may abrade or burnish a knife when drawn along the rod. The apparatus 10 includes a knife sharpening means 26 specifically adapted for receipt in the opening 22 and recess 24. The knife sharpening means 26 has a post 28 which is preferably of a cross-section to provide an interference or snug fit in the opening 22 and/or recess 24. Alternately, the post 28 may include some additional feature to assist in its retention, such as a detent or spring. If the opening 22 and the recess 24 are square in cross section, the post 28 may have either a round or a square cross section.

In this embodiment the knife sharpening means 26 is of the form illustrated in FIGS. 1 to 4 which has a pair of sharpening elements in the form of wheels 30 rotatably mounted on an axle 32. The axle 32 runs generally perpendicular to the direction in which the knife blade is pulled (or pushed) through the sharpening means in use. Typically the wheels may be made of a ceramic material, but they may be made of any suitable material. To sharpen a blade of a knife, the blade is pulled (or pushed) through the space between the two sharpening wheels 30. Similar forms of "pull-through" sharpening means may include additional sharpening wheels either on the same axle 32 or on one or more additional axles. As used herein, the term "pull-though" as applied to the sharpening means includes either pulling or pushing the knife through the sharpening means.

Alternative embodiments of knife storage and sharpening apparatus according to the invention may include different knife sharpening means which have alternative sharpening elements in place of wheels. Three alternatives, all of which are of the general kind called "pull through" are illustrated in FIGS. 5 to 7.

Figure 5:
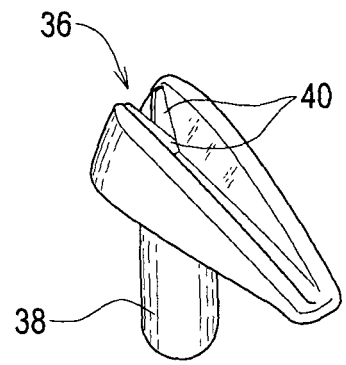
FIG. 5 is a perspective view of a second embodiment of a knife sharpening means which can be used as part of a knife storage and sharpening apparatus according to the invention.

Referring to FIG. 5, a knife sharpening means 36 has a post 38 for receipt in the opening 22 and has two or more fixed blades 40, in a generally "V" formation, which act as the sharpening elements. The blades 40 may be metallic, but may also be made of other suitable materials.

Figure 6:
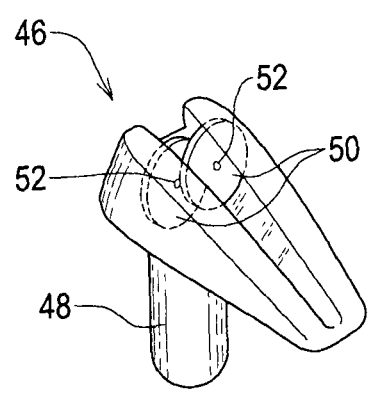
FIG. 6 is a perspective view of a third embodiment of a knife sharpening means which can be used as part of a knife storage and sharpening apparatus according to the invention.

Referring to FIG. 6, a knife sharpening means 46 has a post 48 for receipt in the opening 22 and has sharpening elements in the form of two or more discs 50 located on two axles 52 which run generally parallel to the direction in which the knife blade is pulled through the sharpening means 46. The discs 50 may be metallic, but may also be made of other suitable materials.

Figure 7:
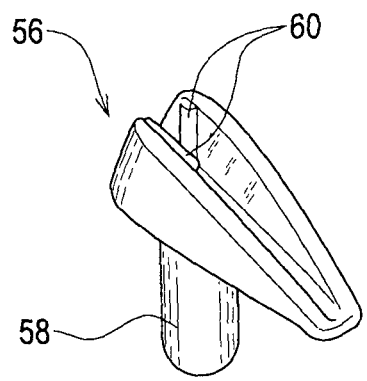
FIG. 7 is a perspective view of a fourth embodiment of a knife sharpening means which can be used as part of a knife storage and sharpening apparatus according to the invention.

Referring to FIG. 7, a knife sharpening means 56 has a post 58 for receipt in the opening 22 and has two or more fixed rods 60, in a generally "V" formation, which act as the sharpening elements. The rods 60 may be ceramic, but may also be made of other suitable materials.

The invention provides the advantage that an easy to use knife sharpening means of a simple form to use is mounted in a sharpening steel opening in a knife block. If the knife user prefers to use a sharpening steel, the knife sharpening means is removed from the opening in the knife block to provide for storage of the sharpening steel.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof. It will be appreciated that various modifications and changes may be made to the above described preferred embodiments of the invention without departing from the scope of the following claims.

The invention claimed is:

1. A knife storage and sharpening apparatus including a knife storage block having a plurality of elongate recesses each for receipt of a different knife and having an elongated recess adapted for receipt of an elongated rod shaped knife sharpening end of a knife sharpening steel when the knife sharpening steel is not in use, and wherein the apparatus includes a knife sharpening means different from a knife sharpening steel removably mounted in the knife sharpening steel recess in place of a knife sharpening steel such that the knife sharpening means can be used to sharpen a knife while the knife sharpening means is mounted in the knife sharpening steel recess, wherein a knife sharpening steel and the knife sharpening means are interchangeable in the elongated recess.

2. A knife storage and sharpening apparatus according to claim 1 wherein the knife sharpening means is of the form known as "pull-through" which is used to sharpen a blade of a knife by pulling and/or pushing the blade of the knife through the sharpening means.

3. A knife storage and sharpening apparatus according to claim 2 wherein the "pull-through" knife sharpening means has a plurality of rotatable wheels on one or more axles and is used to sharpen a knife by pulling and/or pushing the blade of the knife through between the sharpening wheels in a direction generally perpendicular to the one or more axles.

4. A knife storage and sharpening apparatus according to claim 2 wherein the "pull-through" knife sharpening means has a plurality of fixed blades and is used to sharpen a knife by pulling and/or pushing the blade of the knife through between the blades.

5. A knife storage and sharpening apparatus according to claim 2 wherein the "pull-through" knife sharpening means has a plurality of discs on at least two axles and is used to sharpen a knife by pulling and/or pushing the blade of the knife through between the discs in a direction generally parallel to the at least two axles.

6. A knife storage and sharpening apparatus according to claim 2 wherein the "pull-through" knife sharpening means has a plurality of fixed rods and is used to sharpen a knife by pulling and/or pushing the blade of the knife through between the rods.

* * * * *